United States Patent [19]

Edwards

[11] Patent Number: 5,501,586
[45] Date of Patent: Mar. 26, 1996

[54] NON-CONTACT ROTARY VANE GAS EXPANDING APPARATUS

[76] Inventor: Thomas C. Edwards, 1426 Gleneagles Way, Rockledge, Fla. 32955

[21] Appl. No.: 262,408

[22] Filed: Jun. 20, 1994

[51] Int. Cl.$^6$ ........................................... F01C 1/00
[52] U.S. Cl. ........................ 418/264; 418/265; 418/15; 418/159
[58] Field of Search .................... 418/15, 159, 264, 418/265, 261

[56] References Cited

U.S. PATENT DOCUMENTS

| | | | |
|---|---|---|---|
| 1,922,363 | 8/1933 | Hapkins | 418/265 |
| 2,785,851 | 3/1957 | Menon | 418/265 |
| 4,299,097 | 11/1981 | Shauk et al. | 418/159 |
| 5,160,252 | 11/1992 | Edwards | 418/264 |

FOREIGN PATENT DOCUMENTS

| | | | |
|---|---|---|---|
| 301987 | 4/1987 | U.S.S.R. | 418/264 |
| 3888 | of 1915 | United Kingdom | 418/159 |

*Primary Examiner*—Charles Freay
*Attorney, Agent, or Firm*—Roger W. Jensen

[57] ABSTRACT

A non-contact rotary vane gas expanding apparatus functions to convert controlled expansion of gas under pressure to rotary motive power. The gas expanding apparatus includes a stator housing, a rotor supported in the stator housing to undergo rotation relative thereto with the rotor having an output member thereon, a plurality of vanes disposed in a plurality of radial slots defined in the rotor and being circumferentially spaced from one another and radially reciprocable relative to the rotor such that outer tip portions of the vanes are maintained in non-contacting substantially sealed relation with the stator housing, a plurality of gas receiving pockets defined in the rotor adjacent to trailing sides of the radial slots and of the outer tip portions of the vanes with reference to the direction of rotation of the rotor relative to the stator housing, and a plurality of formations defined in the stator housing to effectuate the transfer of gas under pressure through the stator housing to successive ones of the gas receiving pockets to enable the expansion of the pressurized gas therein to cause rotation of the rotor and the output member therewith. The non-contact rotary vane gas expanding apparatus can be utilized in a rotary motive power production system in conjunction with a source of thermal energy, a closed flow circuit, and a control arrangement defining fluid pressure transfer paths connected to the gas expanding apparatus for enabling the system to automatically develop the optimum thermal conversion efficiency by automatically matching the pressure ratio thermally generated across the gas expanding apparatus with the pressure ratio thermally generated in the closed flow circuit.

14 Claims, 6 Drawing Sheets

NON-CONTACT ROTARY VANE GAS EXPANDING APPARATUS

BACKGROUND OF THE INVENTION

1. Field of the Invention

The present invention generally relates to the conversion of controlled expansion of gas under pressure to motive energy for performing work and, more particularly, is concerned with a non-contact rotary vane gas expanding apparatus for converting controlled expansion of gas under pressure to rotary motion.

2. Description of the Prior Art

The controlled expansion of gases, normally heated by combustion or nuclear energy, forms the basis for essentially all motive energy utilized by modern civilization. Steam turbines, for example, expanding steam heated by fossil or nuclear fuels in electric power plants, are the prime movers that turn the electric generators. As another example, gas turbines, which expand air heated by the hydrocarbon combustion, propel jet aircraft.

Turbo-expanders convert the momentum (kinetic energy) of the expanding gases (whose velocity arises due to differences in gas pressure occurring across the machine) to motive rotational energy. In cases where thrust is the primary goal of the machine, the remaining unconverted motive energy (kinetic) results directly in thrust. Such machines are called momentum conversion devices.

Another class of thermo-machines convert gas pressure to motive energy directly through the action of pressure differences across sealed moving mechanical surfaces of the machine. Such devices do not depend upon the conversion of momentum or kinetic energy and are known generally as positive displacement machines. A prominent example of such a device is the conventional piston engine. In this type of gas expander, high pressure combustion-heated gases trapped within the piston-cylinder force the piston to move. This linear piston motion is then converted to rotational motion through the kinematic action of the connecting rod and crankshaft.

Normally, positive displacement mechanisms are used for internal combustion engines (e.g. Otto and Diesel cycles), whereas external combustion engines (e.g. Brayton and Rankine cycles) use momentum-conversion devices. A notable but passe' exception are steam locomotive (piston) engines which use the open external combustion Rankine steam cycle.

Momentum conversion expanders (turbines) are highly non-linear devices. That is, their power output is highly dependent upon rotor speed; in fact, the cube of the rotor speed. This extreme power output nonlinearity arises because the kinetic energy contained within the flowing gas is a function of the square of the velocity of the expanding gas. Compounding this non-linearity is the fact that the mass throughput of the expanding gas varies as the first power of the rotor speed. Since the power output of the turbine is the product of the mass flow rate through the machine (the first power) and the kinetic energy content of the flowing gases (the second power), the net turbine power thus varies as the third power of rotor speed.

Such non-linearity in power output as a function of shaft speed is not a serious problem if the application of the turbine expander requires constant speed such as in an electric power generation plant. On the other hand, land vehicles demand extremes in speed changes— from idle to cruise and all intermediate conditions. Further, the torque loads on land vehicles is extremely variable due to speed, acceleration, and terrain changes. For this basic reason, gas turbines have not been and may never be compatiable with automobile propulsion. As well, it is important to realize that turbo-machinery becomes very inefficient (due in large part to inherent blade tip losses) as their size dwindles to low horsepower. Although a secondary matter, this fact also provides resistance to their use as car engines.

An attraction of external combustion power cycles such as the Rankine and Brayton cycles is their essentially steady combustion processes that are very efficient and nearly emission-free. On the other hand, the fuel-burning processes occurring within internal combustion engines are very unsteady and thus less energy-efficient and contain considerable pollutants. These emissions are so problematical that expensive catalytic converter systems have had to be developed in order to continue the widespread use of internal combustion engines in vehicles.

Thus, on the one hand, extremely efficient and clean-burning power cycles are known heretofore which must use highly non-linear and relatively large prime movers. On the other hand, less efficient and polluting internal combustion power cycles are known heretofore which operate with linear positive displacement machines suitable for vehicle propulsion.

What is desirable for land propulsion, then, is a gas expander apparatus that is suitable for use as a vehicle engine, but which can operate with clean external combustion cycles, such as Rankine or Brayton cycles.

SUMMARY OF THE INVENTION

The present invention provides a non-contact rotary vane gas expanding apparatus designed to satisfy the aforementioned need. The gas expanding apparatus of the present invention is operable to convert controlled expansion of gas to rotary motive power and to thereby produce essentially a linear power output as a function of engine speed and also produce high low-speed torque in relatively low power outputs. While the gas expanding apparatus of the present invention is useful as a propulsion device, it not so limited in its applications.

Accordingly, the present invention is directed to a non-contact rotary vane gas expanding apparatus for converting controlled expansion of gas under pressure to rotary motive power. The gas expanding apparatus comprises: (a) a stator housing; (b) a rotor .supported in the stator housing to undergo rotation relative thereto, the rotor having an output member; (c) at least one vane disposed in at least one radial slot defined in the rotor and being reciprocable radially relative to the rotor with an outer tip portion of the vane being maintained in non-contacting substantially sealed relationship with the stator housing; (d) at least one gas receiving pocket defined in the rotor adjacent to a trailing side of the radial slot and of the outer tip portion of the vane with reference to the direction of rotation of the rotor relative to the stator housing; and (e) means defined in the stator housing for guiding the transfer of gas under pressure through the stator housing to the at least one gas receiving pocket to enable the expansion of the pressurized gas therein so as to cause rotation of the rotor and the output member therewith.

The pressurized gas transfer guiding means in the stator housing includes a primary bore defined therein having a primary surface curved concentrically around a stator axis and a secondary bore defined therein having a secondary surface curved concentrically about a rotor rotational axis extending parallel to but spaced a preselected distance from the stator axis. The secondary surface intersects the primary surface to form a pair of angularly spaced edge junctions on the primary surface of the stator housing being respectively leading and trailing with respect to one another and with reference to the direction of rotation of the rotor within the primary bore of the stator housing.

The pressurized gas transfer guiding means also includes a gas inlet port and a gas outlet port defined through the stator housing. The gas inlet port communicates only with the secondary bore between the leading and trailing edge junctions on the primary surface of the stator housing. The gas outlet port communicates only with the primary bore and is disposed at a preselected angular distance upstream from the leading edge junction on the primary surface of the stator housing.

The primary and secondary bores and gas inlet and outlet ports facilitate functioning of the gas expanding apparatus as a motor with the rotor and output member thereof functioning as a part of a rotary drive shaft in response an initial volume of gas under pressure being transferred from the gas inlet port through the secondary bore to the gas receiving pocket disposed adjacent to the trailing side of the vane when the vane is disposed proximate to the secondary bore and the initial volume of gas under pressure being allowed to expand thereafter, thereby causing rotation of the rotor by the effect of the pressurized gas being applied on the trailing side of the vane adjacent to the gas receiving pocket.

The present invention is also directed to the gas expanding apparatus including a plurality of vanes disposed in a plurality of radial slots defined in the rotor and being circumferentially spaced from one another and radially reciprocable relative to the rotor with outer tip portions of the reciprocable vanes being maintained in non-contacting substantially sealed relationships with the stator housing, and a plurality of gas receiving pockets defined in the rotor adjacent to trailing sides of the radial slots and of the outer tip portions of the vanes with reference to the direction of rotation of the rotor relative to the stator housing. The pressurized gas transfer guiding means now transfers pressurized gas to successive ones of the gas receiving pockets in the rotor to enable the expansion of the pressurized gas in the successive pockets to cause rotation of the rotor and the output shaft therewith.

The present invention is further directed to a rotary motive power production system which comprises: (a) a source of thermal energy; (b) a closed flow circuit containing a working fluid and including first and second sections having respective pressures in a first ratio therein created by transfer of thermal energy from the source thereof into the working fluid at the first section which causes flow of the working fluid about the closed flow circuit to the second section and by transfer of thermal energy from the working fluid at the second section which causes flow of the working fluid back to the first section of the closed flow circuit; (c) means interposed in the closed flow circuit between and in flow communication with the first and second sections thereof for receiving the working fluid from the first section and discharging the working fluid to the second section and being provided with respective pressures in a second ratio therein for converting at least some of the thermal energy of the working fluid, by controlled expansion of the working fluid, to produce rotary motive power; and (d) a control arrangement defining first and second fluid pressure transfer paths connecting the thermal energy converting means to the closed flow circuit so as to cause automatic matching of the pressures in the second ratio with the pressures in the first ratio.

These and other features and advantages of the present invention will become apparent to those skilled in the art upon a reading of the following detailed description when taken in conjunction with the drawings wherein there is shown and described an illustrative embodiment of the invention.

BRIEF DESCRIPTION OF THE DRAWINGS

In the following detailed description, reference will be made to the attached drawings in which.

DETAILED DESCRIPTION OF THE INVENTION

Figure 1:
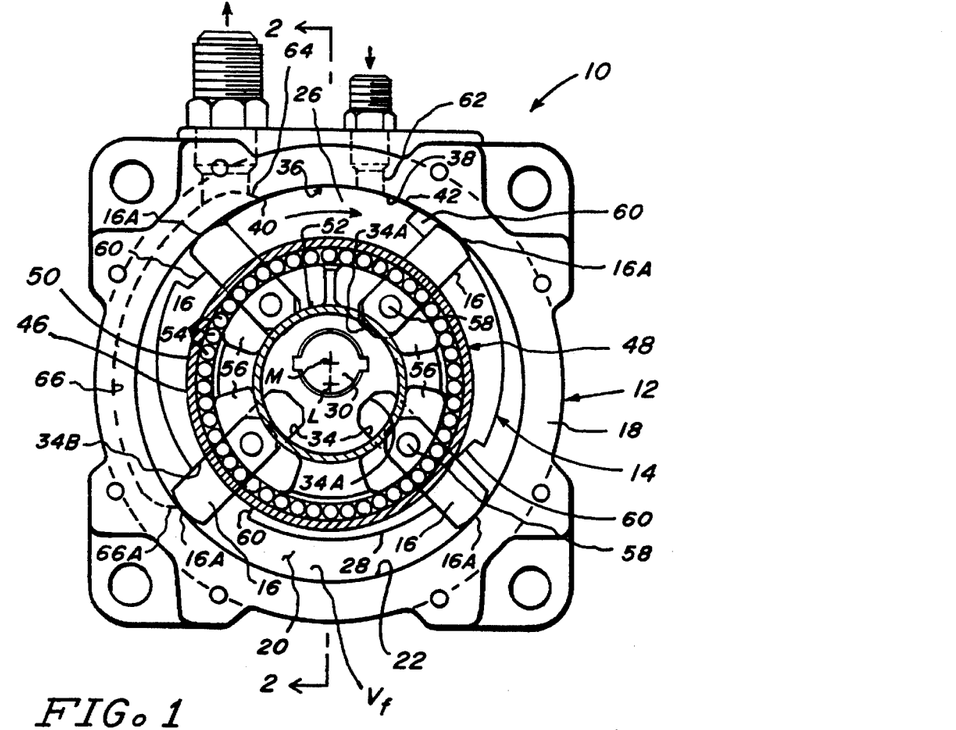
FIG. 1 is a front elevational view of a single expansion volume ratio embodiment of the non-contact rotary vane gas expanding apparatus of the present invention with portions of a stator housing of the apparatus being removed to expose a rotor, a plurality of radial vanes supported thereon and a bearing arrangement on the stator housing which controls the reciprocable motion of the radial vanes.
Figure 2:
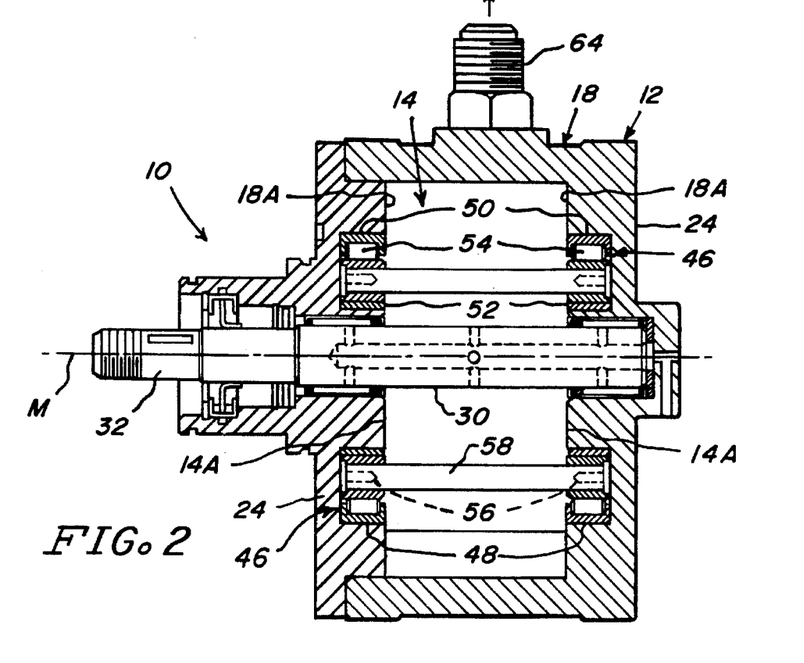
FIG. 2 is an axial sectional view of the gas expanding apparatus taken along line 2—2 of FIG. 1.
Figure 3:
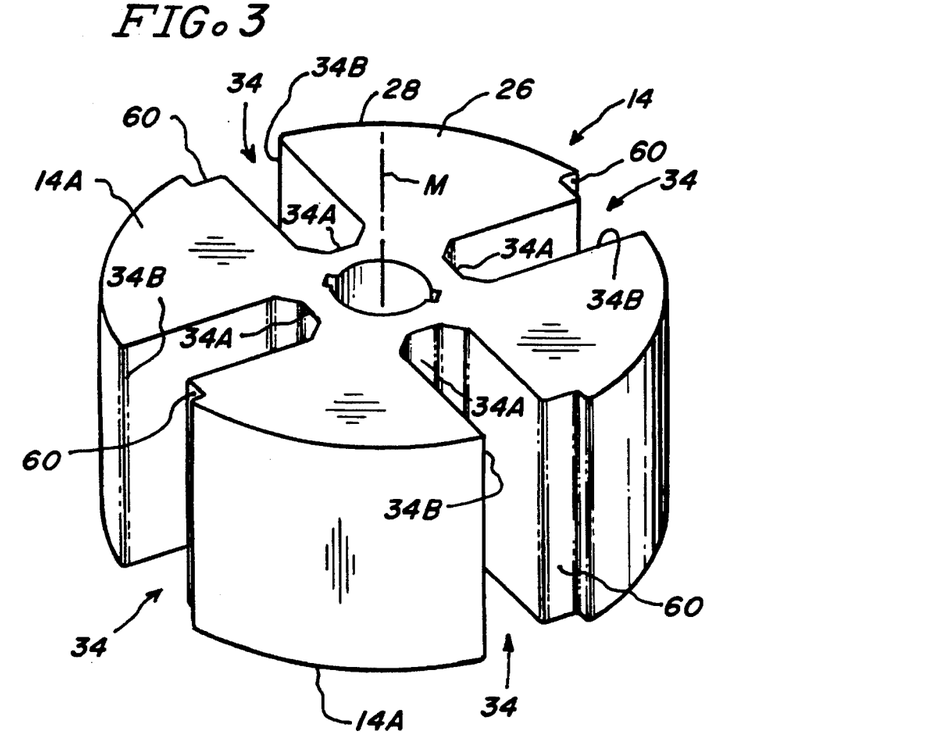
FIG. 3 is an enlarged perspective view of the rotor of the gas expanding apparatus removed from the stator housing.

Referring to the drawings and particularly to FIGS. 1 to 3, there is illustrated a non-contact rotary vane gas expanding apparatus, generally designated 10, of the present invention. The gas expanding apparatus 10 is adapted to function as a motor for converting controlled expansion of gas under pressure to rotary motive power. Basically, the gas expanding apparatus 10 includes a stator housing 12, a rotor 14, and a plurality of vanes 16 movably mounted to the rotor 14.

The stator housing 12 of the apparatus 10 includes a housing body 18 having an interior primary bore 20 defined by an interior primary surface 22 being curved concentrically around a longitudinal axis L of the housing body 18. The primary bore 20 extends between opposite ends 18A of the housing body 18 and has a generally right cylindrical shape. The stator housing 12 also includes a pair of endplates 24 attached to the opposite ends 18A of housing body 18 and closing the axial opposite ends of primary bore 20 to define an enclosed space within the stator housing 12.

The rotor 14 of the apparatus 10 includes a generally right cylindrical body 26 having an exterior or outer surface 28 curved concentrically around a longitudinal axis M of the rotor 14 and a central shaft 30 which together with the end plates 24 of the stator housing 12 positions and rotatably supports the rotor body 26 in the primary bore 20. The central shaft 30 and longitudinal rotational axis M of the rotor 14 are offset from the longitudinal axis L of the stator housing 12 and thus disposed in an eccentric position in the primary bore 20 relative to the primary surface 22 thereof in the stator housing body 18 so that as the rotor 14 undergoes rotation symmetrically about its longitudinal axis M on the shaft 30, it undergoes asymmetrical rotation about the longitudinal axis L of the stator housing 12. Also, the central shaft 30 of the rotor 14 has an output member 32, such as an output drive shaft, extending axially from one end thereof.

Referring to FIGS. 1–3, the rotor 14 has a pair of opposite axial ends 14A and an axial length preselected to be substantially the same as the axial length of the primary bore 20. Also, the rotor 14 has a plurality of slots 34 formed therein extending radially from the longitudinal rotational axis M of the rotor 14 and being circumferentially spaced from one another about the longitudinal axis M. The slots 34 have inner ends 34A spaced radially from the longitudinal axis M and outer ends 34B that terminate at the outer surface 28 of the rotor body 26. The slots 34 also extend longitudinally between opposite axial ends 14A of the rotor 14.

Figure 4:
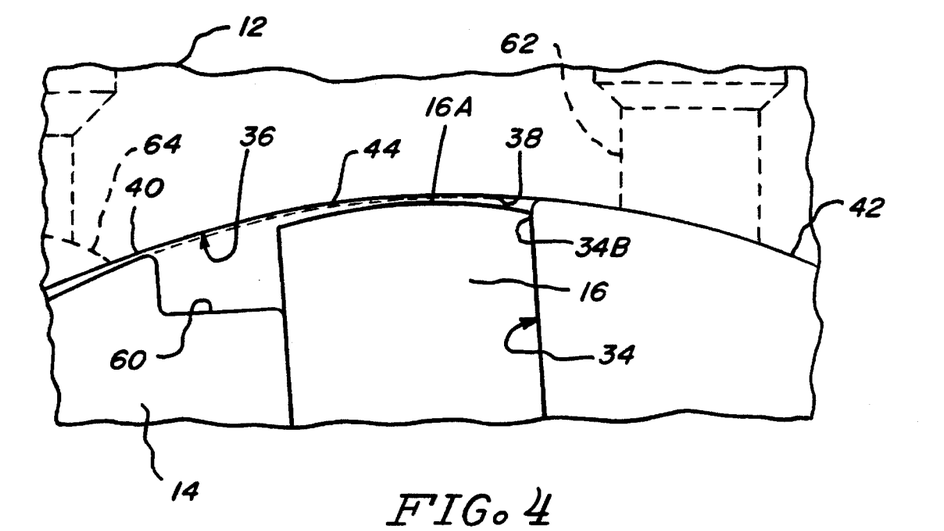
FIG. 4 is an enlarged fragmentary detailed view of the stator housing and rotor showing the clearances which provide a non-contacting sealed relationship therebetween along a secondary surface of the stator housing extending between gas inlet and outlet ports.
Figures 5A, 5B, 5C, 5D:
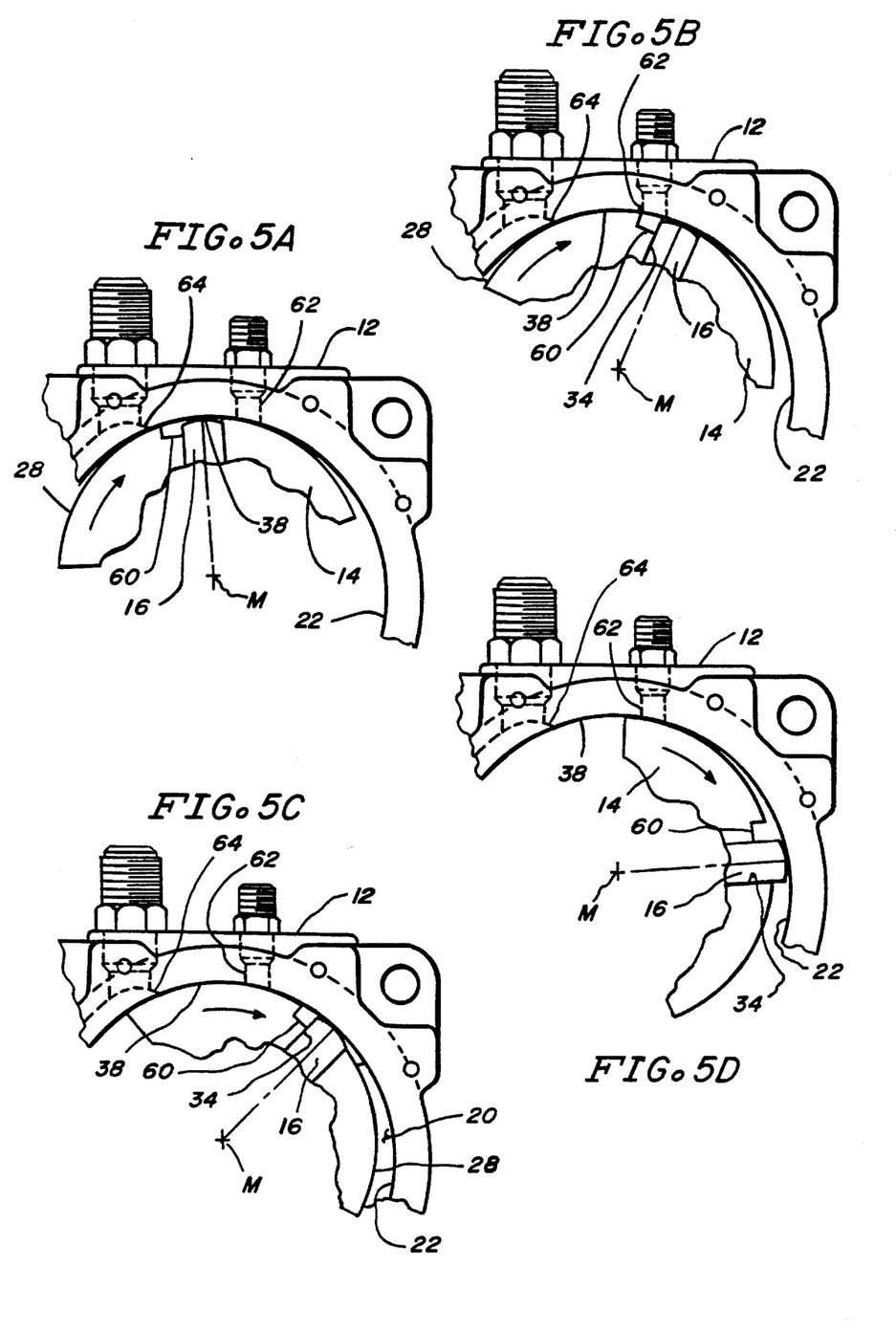
FIGS. 5A–5D are diagrammatic views showing successive positions of a vane of the apparatus along the primary and secondary surface of the stator housing before, during and after the transfer of gas under pressure to the gas receiving pocket in the rotor adjacent to the vane and the expansion of the gas therein to cause rotation of the rotor.

Referring to FIGS. 1 and 4, the housing body 18 of the stator housing 12 also has an interior counter or secondary bore 36 defined by an interior secondary surface 38 curved concentrically about the longitudinal axis M of the rotatable rotor 14 and central shaft 30 but spaced from the longitudinal axis L of the primary surface 22. Thus, the opposite ends of the secondary surface 38 intersects the primary surface 22 so as to form a pair of angularly spaced edge junctions 40, 42 on the primary surface 22 being respectively leading and trailing junctions with respect to one another and with reference to the direction of rotation of the rotor 14 within the primary bore 20 of the stator housing 12. The radius of the secondary bore 36 is generally equal to the radius of the rotor 14 plus a preselected short length to provide a sufficient clearance or gap 44, as seen in FIG. 4, between the outer surface 28 of the rotor body 26 and the secondary surface 38 of the stator housing 12 to prevent contact therebetween and still provide a gas sealing function preventing respective gas flow adjacent to the rotor outer surface 28 and stator secondary surface 38 between the angularly spaced leading and trailing edge junctions 40, 42.

The plurality of vanes 16 of the apparatus 10 are disposed in the plurality of radial Slots 34 defined in the rotor 14 and thus are circumferentially spaced from one another about the longitudinal axis M of the rotor 14. The vanes 16 are mounted within the slots 34 so as to be radially reciprocable relative to the rotor 14 with the outer tip portions 16A of the vanes 16 being maintained in adjacent non-contacting substantially sealed relationships with the primary and secondary surfaces 22, 38 of the stator housing 12.

The apparatus 10 also preferably includes suitable means for controlling the reciprocable movement of the vanes 16 within the slots 34 of the rotor 14. One preferred means, as seen in FIGS. 1 and 2, is an anti-friction radial vane guide assembly 46 disposed in the endplates 24 of the stator housing 12 and mounting the vanes 16 within the slots 34 of the rotor 14 for controlling their movements between preselected inner and outer positions relative to the rotor 14, as seen in FIG. 1, so as to maintain the aforementioned adjacent non-contacting substantially sealed relationships with the primary and secondary surfaces 22, 38 of the stator housing 12. The vane guide assembly 46 per se is the subject of an earlier U.S. Pat. No. 5,087,183 issued to the inventor herein and its disclosure is hereby incorporated herein by reference.

The vane guide assembly 46 basically includes a pair of anti-friction roller bearings 48 disposed as mirror images of one another on the opposite endplates 24 of the stator housing 12. Each of the bearings 48 of the vane guide assembly 46 includes an outer race 50, an inner race 52, a plurality of rollers 54 disposed between the outer and inner races 50, 52, and a plurality of gliders 56 disposed between and movably mounted by the rollers 54 and the inner race 52, and a plurality of axles 58 mounted through the vanes 46 and rotatably supported at opposite ends by opposing pairs of the gliders 56 which, in turn, are movably mounted by the anti-friction roller bearings 48. The above-described vane guide assembly 46 serves to precisely control, with generation of only minimum mechanical friction, the radial motion of the vanes 16 through the combined action of the axles 58, gliders 56 and freely-rotating annular rolling bearings 48 disposed within the endplates 24. This arrangement enables the precise bi-axial radial motion control of the vane location such that the outer tip portions 16A of the vanes 16 remain in exceedingly close and therefore gas-sealing proximity, but essentially frictionless non-contacting relationship with the interior primary surface 22 of the stator housing body 18. FIG. 4 shows the preselected clearance at which the outer tip surface 16B of one vane 16 is maintained with the primary and secondary surfaces 22, 38 of the stator housing 12 so as to provide a non-contacting sealed relationship between vanes 16 and stator housing 12.

Referring to FIGS. 1, 3 and 4, the rotor 14 of the apparatus 10 also has a plurality of gas receiving notches or pockets 60 defined in the rotor 14. Each pocket 60 is formed adjacent to a trailing side of one of the radial slots 34 and a trailing side of the outer tip portion 16A of a corresponding one of the vanes 16 with reference to the direction of rotation of the rotor 14 relative to the stator housing 12, which is depicted as clockwise in FIG. 1.

The gas expanding apparatus 10 also includes means for guiding the transfer of gas under pressure through the stator housing 12 to successive ones of the gas receiving pockets 60 to enable the expansion of the pressurized gas therein so as to cause rotation of the rotor 14 and the output drive shaft 32 therewith. The pressurized gas transfer guiding means includes the above-described primary surface 22 and secondary surface 38 of the stator housing 12. The pressurized gas transfer guiding means also includes a gas inlet port 62 and a gas outlet port 64 defined through the stator housing 12. The gas inlet port 62 communicates only with the secondary bore 36 defined between the leading and trailing edge junctions 40, 42 on the primary surface 22 of the stator housing 12. The gas outlet port 64 communicates only with the primary bore 22 and is disposed at a preselected angular distance upstream from the leading edge junction 40 on the primary surface 22 of the stator housing 12. The primary and secondary bores 20, 36 and surfaces 22, 38 and the gas inlet and outlet ports 62, 64 facilitate functioning of the gas expanding apparatus 10 as a motor with the rotor 14 and its output drive shaft 32 being rotated in response to an initial volume of gas under pressure being transferred from the gas inlet port 62 through the secondary bore 36 to the gas receiving pocket 60 disposed adjacent to the trailing side of the one of the vanes 16 disposed proximate to the secondary bore, and thereafter being allowed to expand.

In light of the foregoing description, it will be understood by one of ordinary skill in the art that the overall function of the gas expander apparatus 10 is to provide an apparatus that effectively captures the moving faces of expanding gas pockets and converts this energy to easily-used mechanical rotating motive power. Small pockets of high pressure gas (normally derived from thermal energy inputs) are efficiently expanded to larger pockets of much lower pressure ("spent") gas, and, in so doing, motive rotational power is produced.

The configurations of the stator housing 12 and rotor 14, the eccentric position of the rotor 14 within the stator housing 12, and the positions of the vanes 16 and pockets 60 on the rotor 14, all contribute to the capture of the moving faces of expanding gas pockets and conversion to rotary motive power. As mentioned above, the stator housing primary and secondary bores 20, 36 are comprised of two cylindrical shapes. The first shape is that of the primary cylindrical surface 22 and the second shape is that of the secondary surface 38 which is a segment of a cylinder. The outer cylindrical surface 28 of the rotor 14 is arranged eccentrically with respect to the primary cylindrical surface 22 and concentrically with respect to the secondary cylinder segment surface 38. The secondary surface 38 is "offset" from the primary surface 22 in the same direction as the longitudinal rotational axis M of the rotor 14 is offset from the longitudinal axis L of the stator housing 12. Thus, the secondary surface 38 serves to "nest" successive portions of the outer peripheral cylindrical surface 28 of the rotating rotor 14 along a long peripheral sealing arc and, in such manner, provide an crucial dynamic pressure seal between the high pressure gas inlet port 62 and the low pressure gas outlet port 64.

FIGS. 5A to 5D show successive positions of one vane 16 of the apparatus 10 along the primary and secondary surfaces 22, 38 of the stator housing 10 before, during and after the transfer of gas under pressure to a corresponding gas receiving pocket 60 in the rotor 14 located adjacent to the vane 16 and the subsequent expansion of the gas therein to cause rotation of the rotor 14. When the rotor 14 rotates from the position of FIG. 5A to the position of FIG. 5B, high pressure inlet gas (high energy) entering the gas expanding apparatus 10 through the gas inlet port 62 from any suitable source, such as a steam generator or compressed air tank, and fills the one gas receiving pocket 60 aligned with the gas inlet port 62. As the rotor 14 continues to rotate clockwise from the position of FIG. 5B to the position of FIG. 5C, this initial gas-filled volume in the one pocket 60 begins to undergo a controlled volumetric expansion from its beginning volume $V_i$ to the final volume $V_f$. During the beginning stage of this controlled expansion, the initial volume $V_i$ is contained between the trailing edge of the leading one vane 16 located just past the gas inlet port 62 and a leading edge of the dynamic rotor seal region occurring across the rotor periphery between the gas outlet and inlet ports 64, 62. As the expansion proceeds, this expanding pocket of gas becomes bounded by an enlarging volume defined by the trailing edge of the one leading vane 16 and the leading edge of the next trailing vane 16. Also due to the eccentricity of the position of the rotor 14 in the stator housing 12, as clearly shown in FIG. 5D the volume between the outer peripheral surface 28 of the rotor 14 and the primary surface 22 of the stator housing 12 increases. Finally, this controlled expansion process reaches the maximum expansion volume $V_f$, being shown by the volume between the two lower vanes 16 in FIG. 1. At this point, the opening edge 66A of an exhaust channel 66 communicating with the gas outlet port 64 is exposed. Continued rotation of the rotor 14 finally fully exhausts the spent gases contained in the final volume $V_f$ through the gas outlet port 64. This process is repeated continuously so long as high pressure gas remains available, thereby causing rotation of the rotor 14 and, in turn, rotation of the power output drive shaft 32.

Figure 6:
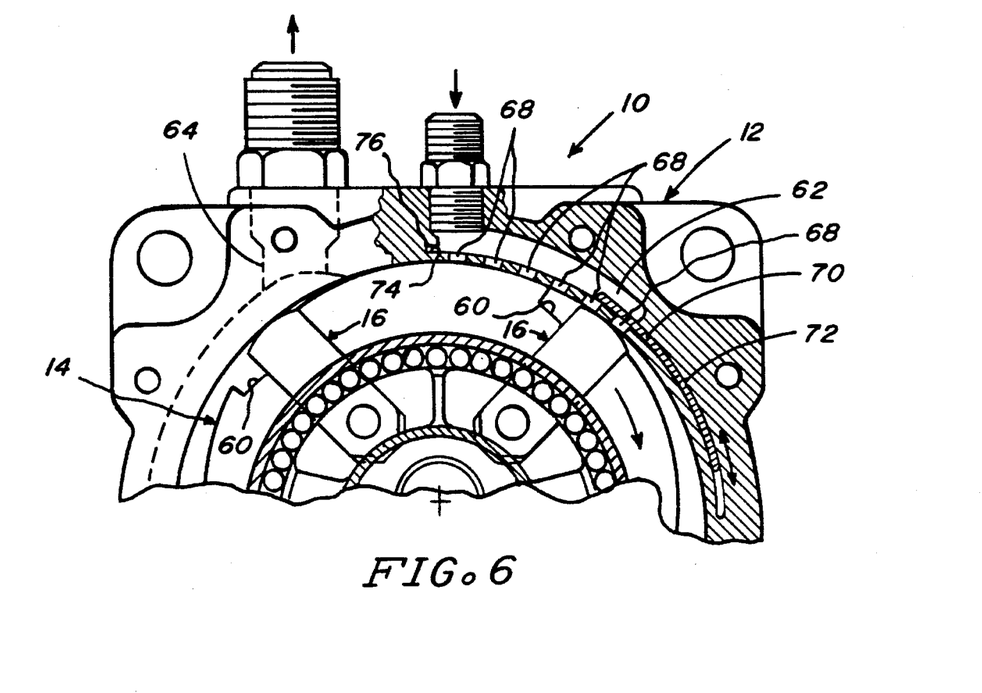
FIG. 6 is a fragmentary front elevational view similar to FIG. 1 but of a variable expansion volume ratio embodiment of the non-contact rotary vane gas expanding apparatus of the present invention.
Figure 7:
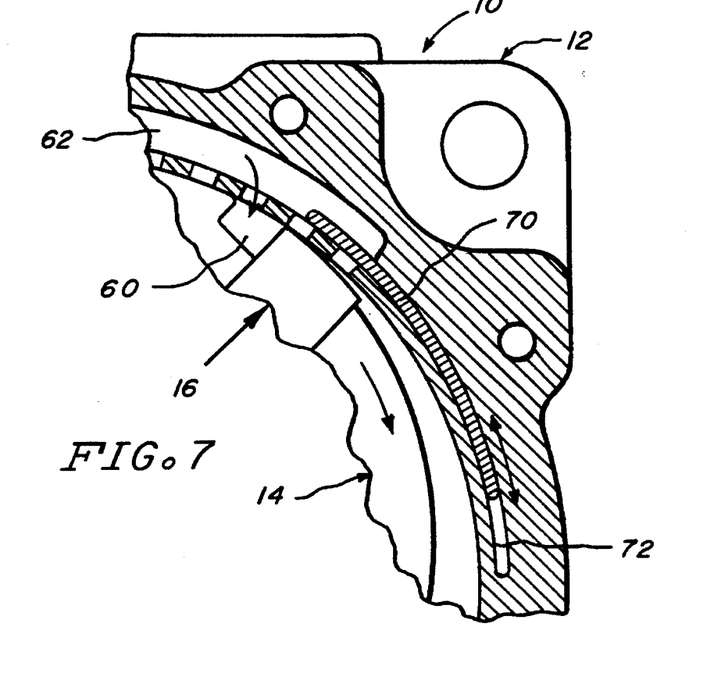
FIG. 7 is an enlarged detailed view of a portion of the gas expanding apparatus of FIG. 6.

Referring to FIGS. 6 and 7, there is illustrated a variable expansion volume ratio embodiment of the non-contact rotary vane gas expanding apparatus 10 of the present invention. This variable expansion volume ratio embodiment of FIGS. 6 and 7 has the same construction as the single expansion volume ratio embodiment of FIGS. 1 and 2, except that in this variable expansion volume ratio embodiment, the gas inlet port 62 includes a plurality of passages 68 defined through the stator housing 12 in closely spaced relation to one another and an inlet control member 70 mounted in another channel 72 formed in the stator housing outwardly from the secondary bore 36. The inlet control member 70 is adjustably movable along the spaced passages 68 of the gas inlet port 62 in order to vary the number of the passages 68 covered by the inlet control member 70 and thereby vary the amount of pressurized gas that enters the respective gas receiving pocket 60. Because the pressure ratio of the expanding source gas pressure to the "spent" outlet gas pressure can vary (especially with the temperature and pressure of the inlet gas), it is useful to be able to efficiently accommodate such variations. This is permitted by means of the plurality of passages 68 making up the gas inlet port 62 and the inlet control member 60 slidably mounted in the channel 72. While this variational adjustment could be carried out by controlling the angular location of the gas outlet port 64, the more energy-efficient way is to control the amount of inlet gas mass entering the apparatus 10 at the gas inlet port 62. This is because when volume ratio control is maintained at the inlet port 62, the maximum expansion volume achievable by the apparatus 10 can be accessed and, therefore, maximum power can be recovered from the minimum input of high pressure gas.

The extent to which inlet gas enters the initial and expanding inlet volume is controlled directly by the angular location of the movable inlet control member 70. As the inlet control member 70 is moved to the right (clockwise), for example, the amount of inlet gas that enters the initially expanding volume region increased. This increase in initial expansion volume increased the value of the total initial expansion volume. Therefore, in this case, the expansion volume ratio is decreased (assuming the maximum expansion volume remains constant). This actual condition arises when additional output power is desired. This occurs because more power is generated under such a circumstance due to the resulting increase in the average pressure contained within the expanding volume. Another important condition under which an increase in total inlet volume is required occurs when the inlet pressure of the inlet gas is reduced (such as when, for example, the thermal input to a pressurized vapor generator is reduced).

On the other hand, when the inlet volume control member 70 is moved to the left (counterclockwise), the total inlet volume is reduced. In the limit, this inlet volume reduction drops to the initial rotor pocket volume. This condition offers the maximum expansion volume ratio. This maximum volume ratio also corresponds to the maximum thermal efficiency obtainable over a given maximum working fluid temperature ratio.

Finally, if the inlet control member 70 is moved entirely to the left limit (fully counterclockwise) such that its left extremity engages a recess 74 and elastomer seal strip 76, the inlet flow is reduced to zero, thereby stopping the apparatus 10.

Figure 8:
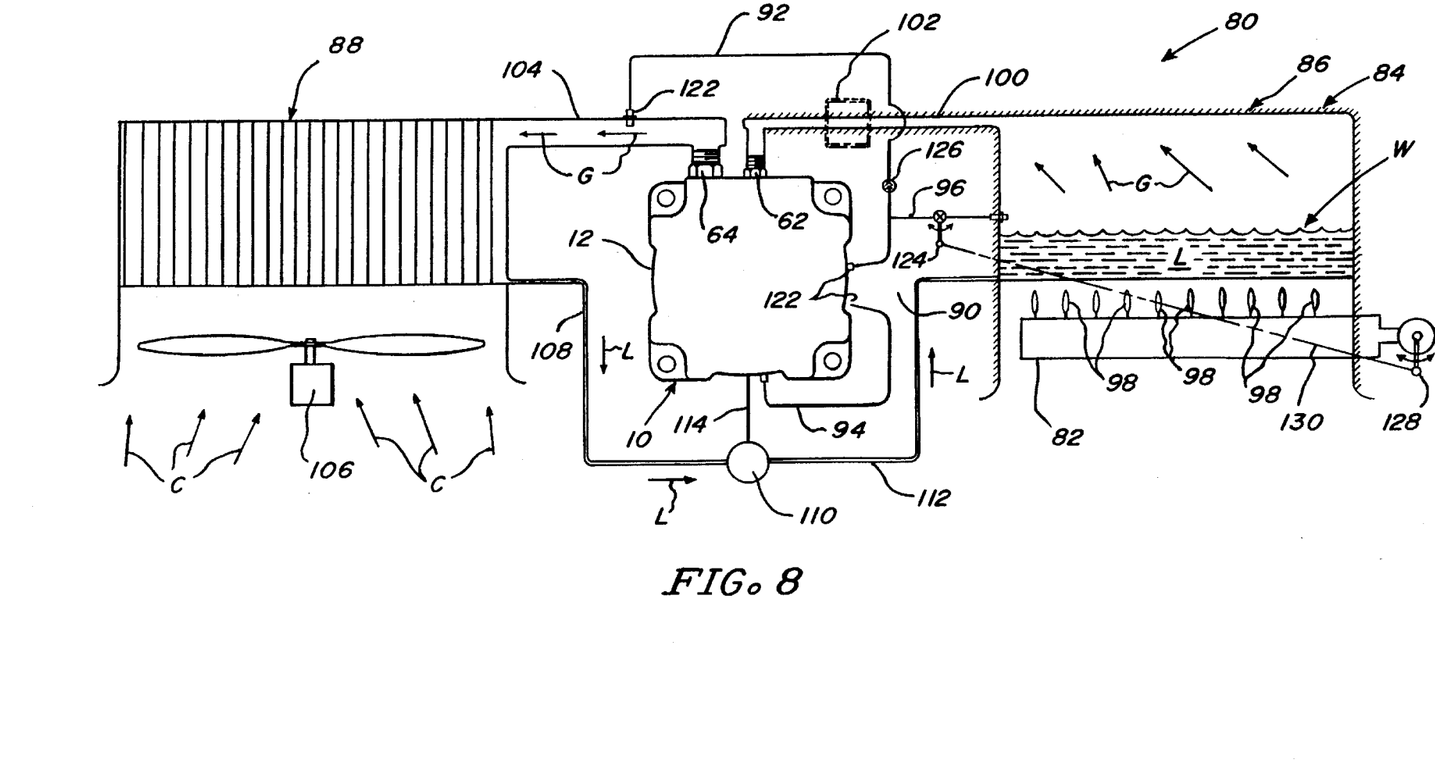
FIG. 8 is a diagrammatic view of a rotary motive power production system utilizing the non-contact rotary vane gas expanding apparatus of the present invention in conjunction with other system components to generate rotary motive power from heat energy derived from a suitable thermal source.
Figure 9:
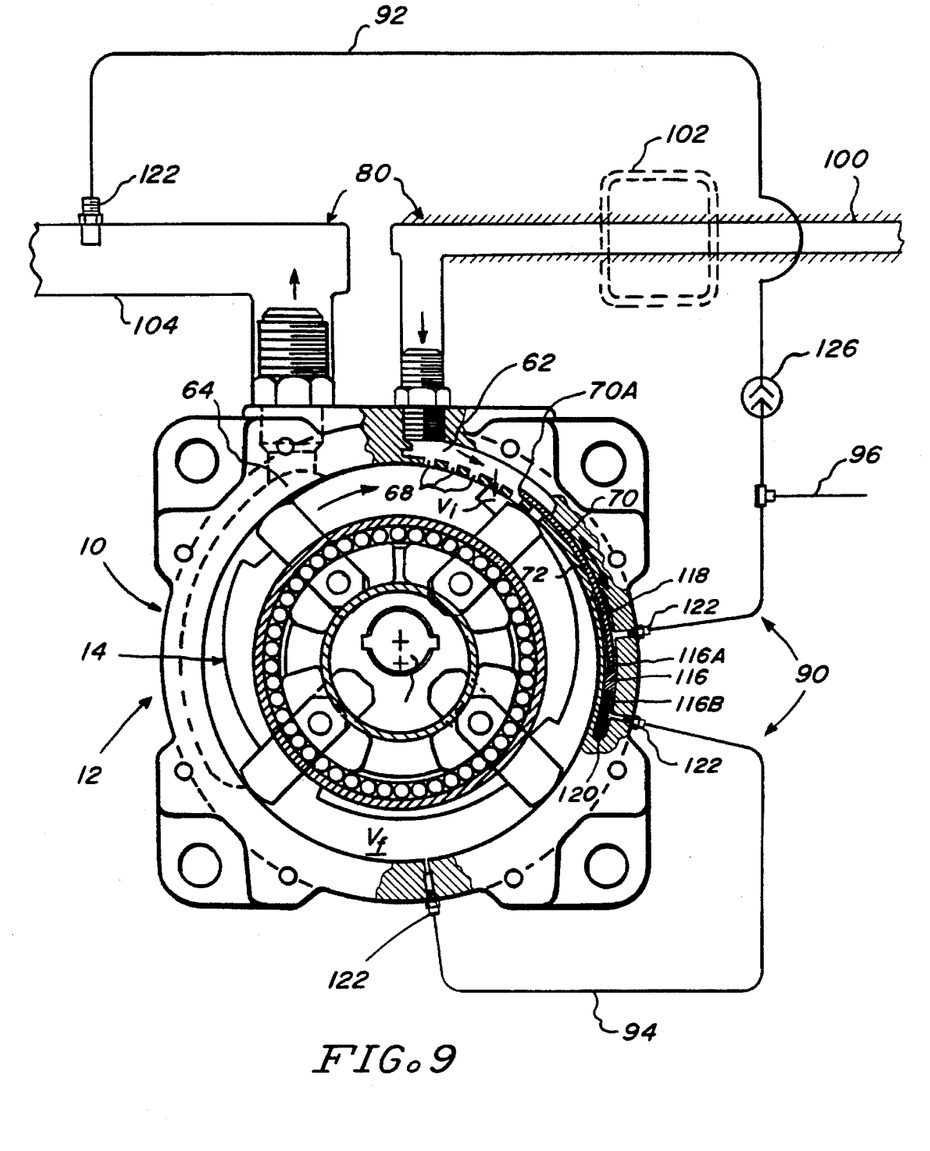
FIG. 9 is an enlarged fragmentary view of the rotary motive power production system showing in detail the arrangement of the non-contact rotary vane gas expanding apparatus with the external fluid pressure transfer lines employed in the system.

Referring to FIGS. 8 and 9, there is shown in a diagrammatic form a rotary motive power production system, also comprising the present invention and being generally designated 80. The above-described variable expansion volume ratio embodiment of the non-contact rotary vane gas expanding apparatus 10 of the present invention is utilized in the rotary motive power production system 80 in conjunction with other system components described below to generate rotary motive power from thermal energy derived from a suitable source, such as the combustion of a fuel.

Referring to FIG. 8, in addition to the gas expanding apparatus 10, the rotary motive power production system 80 basically includes a source of thermal energy 82, a closed flow circuit 84 having first and second sections 86, 88, and a control arrangement 90 defining a plurality of first, second and third pressure transfer paths 92, 94, 96 for enabling the system 80 to automatically develop the optimum thermal conversion efficiency by automatically matching the pressure ratio thermally generated across the gas expanding apparatus 10 with the pressure ratio thermally generated in the closed flow circuit 84.

Optimum thermal efficiency in the gas expanding apparatus 10 can only be reached if the actual mechanical expansion pressure ratio of the apparatus closely matches the actual thermal pressure ratio dictated by the high and low temperature ratios experienced by a working fluid F in the closed flow circuit 84. In a practical sense, this means that the mechanical volume ratio—the ratio of the final (maximum) expansion volume to the initial (minimum) volume—must be such that the pressure reached within the final volume must be equal to the pressure within the region where the gas is exhausted or expelled after it has reached its largest physical value. It should be noted here that the term "volume" refers to the pocket of space containing the expanding gas within the apparatus 10 itself. For a specific example, the "initial" volume means that physical volume of the initial pocket that contains the high pressure inlet gas that arrives from the high pressure gas source (e.g., an air storage tank or, more appropriately to the system 80, a steam or other vapor boiler/generator). The "final" volume means the new physical volume of that same expanding gas pocket when it has reached the limit of its capability to physically grow (expand) in size.

In the example diagrammatically illustrated in FIG. 8, the thermal energy source 82 and the first section 86 of the closed flow circuit 84 of the system 80 take the form of a fuel combustion unit 82 and a pressurized steam or other vapor boiler vessel 86, respectively. The fuel combustion unit 82 is disposed in a thermal energy transfer relationship to the boiler vessel 86 and delivers thermal energy thereto by combusting fuel, as depicted by flames 98. The thermal energy is transferred to a working fluid W which is in lower pressure and temperature liquid phase L and converted by vaporizing to a higher pressure and temperature gas phase as represented by the arrows G. The vaporized working fluid in the high pressure gas phase then flows through an inlet duct 100 of the closed flow circuit 84 to gas inlet port 62 of the stator housing 12 of the gas expanding apparatus 10. It should be noted that an optional mini "start-up" boiler 102, being a miniature version of the main boiler vessel 86, may be provided to enable rapid working-fluid pressure build-up for such applications as quick-start automotive propulsion. In addition, it should be noted that the entire closed flow circuit 84 would be thermally insulated with means well-known to one of ordinary skill in the art and so need not be shown.

As the gaseous phase G of the working fluid expands through the gas expanding apparatus 10, as described earlier, it produces rotational power that is delivered to the central shaft 30 and output drive,shaft 32 of the rotor 14, which are shown in FIG. 2. The "spent" low pressure gas then exits the gas outlet port 64 of the stator housing 12 of the gas expanding apparatus 10 and flows through a discharge duct 104 of closed flow circuit 84 to the second section 88 of the closed flow circuit 84 of the system 80 which takes the form of a condensor 88. As a cooling fluid represented by arrows C, such as ambient air (or alternatively such cooling fluid could be ocean or lake water), is generated and convected across the external surfaces of the condenser 88, such as by operation of a fan 106, a large portion of the residual thermal energy contained in the spent working fluid is removed. This thermal energy extraction process results in the working fluid changing back to the liquid phase L. This condensed (liquid) working fluid exits the condenser 88 through outflow conduit 108 and flows back towards the first section or boiler vessel 86 of the closed flow circuit 84. The closed flow circuit 84 also includes a liquid feed pump 110 being disposed between the condenser 88 and boiler vessel 86 in parallel relationship with gas expanding apparatus 10. The liquid feed pump 110 accepts the low pressure working fluid, now in the liquid phase, and, by increasing its pressure, delivers it back to the boiler vessel 86 through an inflow conduit 112. The feed pump 110 can be operated by an external power source or, alternatively and preferred, can be operated directly from an extension 114 on the rotor shaft 30 extending in the opposite direction away from the drive shaft 32. Upon re-entering the boilder vessel 86, the working fluid in the liquid phase L again receives thermal energy from the combusting fuel. It should be noted that other sources of thermal energy, including solar, electric, nuclear, etc., can produce the vaporized working fluid.

Respective pressures in a first ratio are created in the boiler vessel (first section) 86 and the condensor (second section) 88 by the transfer of thermal energy from the source 82 thereof into the working fluid W in the boiler vessel 86, which causes flow of the working fluid about the closed flow circuit 84 through the gas expanding apparatus 10 to the condensor 88, and by the transfer of thermal energy from the working fluid in the condensor 88, which causes flow of the working fluid back to the boiler vessel 86 via the pump 110. The gas expanding apparatus 10 interposed in the closed flow circuit 84 in flow communication between the boiler vessel 86 and condenser 88 receives the working fluid from the boiler vessel 86 via the inlet duct 100 and discharges the working fluid via the discharge duct 104 to the condenser 88. Pressures are generated in the working fluid passing through the gas expanding apparatus 10 in a second ratio for converting at least some of the thermal energy of the working fluid, by controlled expansion of the working fluid, to produce the aforementioned rotary motive power. An important attribute of the system 80 which is the result of the provision of the control arrangement 90 is the ability to precisely and automatically match the pressures making up the second pressure ratio with the pressures making up first pressure ratio to achieve the optimum thermal conversion efficiency.

Referring again to FIGS. 8 and 9, the control arrangement 90 is employed in conjunction with the inlet control member 70 which was described earlier with reference to FIGS. 6 and 7, to achieve the automatic matching of the pressure ratios. As discussed earlier, the inlet control member 70 which is slidably mounted in the elongated channel 72 extending from the inlet port 62 serves to control the amout of inlet volume exposed to filling by the working fluid in the high pressure gaseous phase. As the inlet control member 70 is slidably moved counterclockwise through the channel 72, fewer of the inlet passages 68 are uncovered and so less inlet gas is admitted into the stator housing 12 of the apparatus 10. This will force the final pressure in the final expansion volume $V_f$ to be lower. Conversely, as the inlet control member 70 is slidably moved clockwise through the channel 72, more of the inlet passages 68 are uncovered and so more high pressure inlet gas enters into the stator housing 12 of the apparatus 10. This results in the gas pressure contained within $V_f$ to be higher. The inlet control member 70 incorporates an arcuate shaped widened extension 116 which, in turn, slidably and sealingly engages with a widened extended arc area 118 of the channel 72. The extension 116 has first and second surfaces 116A, 116B thereon facing respectively toward and away from the inlet port 62 such that the extension 116, in effect, is a piston which responds to the differential pressures acting upon its opposite first and second surfaces 116A, 116B. Also, a force-bias spring 120 is disposed in the channel 72 between the end thereof and the second surface 116B of the control member extension 116.

The control arrangement 90 includes the first fluid pressure transfer path 92 connecting the widened area 118 of the channel 72 with the discharge duct 104 and thus effectively with the outlet port 64 of the stator housing 12 so as to communicate a first pressure of the working fluid at the outlet port 64 (and thus in the condenser 88) to the first surface 116A on the inlet control member extension 116 facing toward the inlet port 62. The control arrangement 90 also includes the second fluid pressure transfer path 94 connecting the widened section 118 of the channel 72 with the primary bore 20 of the stator housing 12 approximately at a location where the expansion region (or pocket) 62 has reached maximum volume so as to communicate a second pressure of the working fluid at the maximum volume to the other of the surfaces 116B on the inlet control member extension 116 facing away from the inlet port 62. The above-described control arrangement 90 will automatically ensure that the final "exhaust" pressure contained within the final maximum volume $V_f$ of the apparatus 10 is precisely equal to the pressure contained within the condensor 88 (which is equal to the pressure in the outlet port 64). If the pressure transmitted from $V_f$ through the second pressure transfer path 94 to the second surface 116B of the control member extension 116 is high (relatively speaking), then the tendency will be for the control member 70 to move counterclockwise toward the inlet port 62. This movement will diminish the amount of high pressure gas admitted through the inlet port 62 and thus will cause a reduction in the pressure contained within $V_f$. Of course, the converse is equally true: if the pressure transmitted through the second pressure transfer path 94 is low (relatively speaking), then the control member 70 will tend to move clockwise, thus increasing the pressure within $V_f$. If, on the other hand, the net sum of the product of the inlet pressure acting on the tip area 70A of the control member 70 and the condenser (outlet port 64) pressure transmitted via the first pressure transfer path 92 to the first surface 116A of the control member extension 116 is high (relatively speaking), then it will tend to cause the control member 70 to move clockwise and thus increase the final pressure within $V_f$. Thus, it can be seen that force bias spring 120, acting with the net differential forces acting upon the slidable inlet control member 70 and its piston extension 116, will tend to maintain the pressure in the final expansion volume $V_f$ at a value very near the condenser pressure. This embodiment thus achieves the important goal of automatically adjusting the mechanical pressure ratio of the apparatus 10 (by actually adjusting the physical expansion volume ratio by changing the inlet volume $V_i$) to just meet the pressure in the condenser 88. It should be noted at this point that, depending upon the actual angular location of connection of the second pressure transfer path 94 to the stator housing 12, the pressure actually sensed will be a periodic pressure change with a frequency equal to four times the rotor speed and with an amplitude determined by the volume ratio it actually subtends. Thus, the pressure transmitted to the second surface 116B of the control member extension 116 will actually be an average pressure slightly higher than the actual pressure occurring in $V_f$. Thus, the value and force-distance properties of the force-bias spring 120 will be defined by methods well-known to conventional spring design and analysis.

Thus, the inlet control member 70 will be slidably moved along channel 72 relative to (that is, toward or away from) the inlet port 62 in correspondence to the difference between the first (condenser) and second (maximum volume) pressures so as to thereby cause automatic matching of the pressures making up the aforementioned second pressure ratio with the pressures making up the aforementioned first pressure ratio. It should be pointed out here that the first and second pressure transfer paths 92, 94 can either be external conduits 92, 94 connected at their respective opposite ends to the aforementioned locations by fittings 122 or, alternatively, these paths can just as well be provided in the form of small passages that are actually machined into the stator housing 12.

Under some circumstances, it will be advantageous to momentarily by-pass (or augment) the automatic volume control features just described. A specific example would be when the output power from the gas expanding apparatus 10 is being applied to the propulsion of a vehicle wherein it is desired to rapidly accelerate the vehicle. Such acceleration can be invoked to cause the net average expansion pressure within the apparatus 10 to rise, for a relatively short duration. This can be easily achieved simply by causing the control member 70 to be moved clockwise and thus admit relatively larger amounts of high pressure gas to the stator housing 12 of the apparatus 10. Even though the pressure contained within $V_f$ will be much higher than for optimum thermal conversion efficiency, it will achieve a very high but momentary power output sufficient for rapid vehicle acceleration.

To achieve this momentary power output control and automatic override capability, the control arrangement 90 preferably also defines the third fluid pressure transfer path 96 connecting channel 72 with the boiler vessel 86 of the closed flow circuit 84 so as to communicate the pressure of the working fluid in the boiler vessel 86 to the first surface 116A on the inlet control member extension 116. This pressure will cause movement of the inlet control member 70 along the channel 72 in clockwise direction away from the inlet port 62 so as to substantially increase the amount of working fluid passing through the inlet port 62 into the expansion region of the stator housing 12 and thereby accelerate the rotational motion of the rotor 14.

More particularly, the third pressure transfer path 96 is defined by a conduit extending from the boiler vessel 86 through a "throttle" control valve 124 to the first (low) pressure tranfer path 92. A check valve 126 is interposed in the path 92 to prevent the high pressure boiler gas from short-circuiting to the condenser 88 via the discharge duct 104. When the throttle control valve 124 is opened, a very small amount of the high pressure gas from the boiler vessel 86 will flow into the channel 72 adjacent to the first surface 116A and thus force the slidable control member 70 to move clockwise and increase the average expansion pressure and, therefore, the net power output of the apparatus 10. When the throttle control valve 124 is fully closed, the system 80 returns to the fully automatic efficiency control. It is worthy of mention that because in actuality there will be minute amounts of leakage around the input control member 70, the variable position of the throttle control valve 124 can actually exert a continuously-variable effect on actual apparatus power output. Therefore, the control means disclosed here not only ensures maximum fuel efficiency, it also offers an extremely simple means of continously controlling the actual power output of the Rankine engine.

Finally, while the reservoir of vaporized gas contained within the boiler vessel 86 is sufficient for momentary bursts of power output, in order to sustain higher levels of power delivery, additional thermal energy must be transferred to the working fluid to accommodate the extra power delivered to the gas expanding apparatus 10. This is very easily achieved in the system 80 of the present invention simply by linking the position of the throttle control valve 124 to an inlet fuel flow control 128. As can be seen in FIG. 8, this linkage is illustrated by a dashed line 130. Thus, as the throttle control valve 124 is advanced to create higher output, it simultaneously opens further the flow of fuel to the combustion unit 82, thereby instantly causing an increase in thermal energy delivery to the working fluid W in the boiler vessel 86. Conversely, if less power is demanded, closing the throttle control valve 124, which reduces the amount of inlet gas delivery to the apparatus 10, will also reduce the amount of fuel flowing to the combustion unit 82 thereby instantaneously matching the thermal output to the actual motive power delivery.

It is thought that the present invention and its advantages will be understood from the foregoing description and it will be apparent that various changes may be made thereto without departing from its spirit and scope of the invention or sacrificing all of its material advantages, the form hereinbefore described being merely preferred or exemplary embodiment thereof.

I claim:

1. A non-contact rotary vane gas expanding apparatus for converting controlled expansion of gas to rotary motive power, said apparatus comprising:

(a) a stator housing including a primary bore having a primary surface curved concentrically around a stator axis and a secondary bore having a secondary surface curved concentrically about a rotor axis extending parallel to and spaced a preselected distance from said stator axis, said secondary surface intersecting said primary surface to form angularly spaced edge junctions on said stator housing being respectively leading and trailing with respect to one another and with reference to a predetermined direction of rotation within said stator housing;

(b) a rotor supported in said primary bore of said stator housing and having an outer surface curved concentrically around said rotor axis, said rotor axis being offset from said stator axis toward said secondary surface such that said outer surface of said rotor undergoes rotation about said rotor axis in eccentric relation to said primary surface and in concentric relation to said secondary surface, said rotor having a rotor radius and said secondary bore having a radius equal to said rotor radius plus a preselected gap clearance selected to be relatively small so as to provide a gas sealing function preventing respective gas flow adjacent to said rotor outer surface and stator secondary surface between said angularly spaced leading and trailing edge junctions thereof;

(c) means defining at least one slot defined in said rotor extending radially relative to said rotor axis and terminating at said outer surface of said rotor;

(d) means defining a gas receiving pocket in said rotor adjacent to each said radially extending slot at a trailing side thereof relative to the direction of rotation of said rotor;

(e) at least one vane, said vane being disposed in said slot of said rotor and being movable radially within said slot relative to said rotor and said rotor axis thereof, said vane having an outer tip surface spaced from said primary and secondary surfaces of said stator housing by a preselected clearance so as to provide a gas seal therewith preventing gas flow past said outer tip surface of said vane between said vane and said primary and secondary surfaces of said stator housing;

(f) means defining a gas inlet port in said stator housing open only into said secondary bore between said leading and trailing edge junctions on said stator housing; and (g) means defining a gas outlet port in said stator housing open only into said primary bore and disposed at a preselected angular distance upstream from said leading edge junction on said stator housing such that said gas expanding apparatus can function as a motor and said rotor can function as a part of a rotary drive shaft when an initial volume of a gas under pressure is transferred through said secondary bore to said gas receiving pocket disposed adjacent to said trailing side of said vane via said gas inlet port when said vane is disposed proximate to said secondary bore, said initial volume of pressurized gas expanding thereafter and causing rotation of said rotor by the effect of said pressurized gas being applied on said trailing side of said rotor vane adjacent to said gas receiving pocket.

2. The apparatus of claim 1 further comprising:

means disposed in said stator housing and coupled to said at least one vane for controlling said radial reciprocable movement thereof in said rotor slot so that said outer tip portion of said vane is continuously positioned adjacent to said primary and secondary surfaces of said stator housing and spaced therefrom by a preselected clearance so as to be maintained in said non-contacting substantially sealed relationship with said stator housing.

3. The apparatus of claim 2 wherein said vane movement controlling means includes a pair of annular bearings disposed in opposite ends of said stator housing and an axle extending between said bearings and through said vane.

4. The apparatus of claim 3 wherein each of said annular bearings includes an outer race, an inner race, a plurality of rollers disposed between said outer and inner races, and a pair of opposing gliders disposed between and movably mounted by said rollers and said inner race, said axle being rotatably supported at opposite ends by said pair of opposing gliders.

5. The apparatus of claim 1 further comprising:

a plurality of said vanes disposed in a plurality of said radial slots defined in the rotor and being spaced circumferentially from one another and radially reciprocable relative to said rotor with said outer tip portions of the reciprocable vanes being maintained in non-contacting substantially sealed relationships with said stator housing.

6. The apparatus of claim 5 further comprising:

a plurality of said gas receiving pockets defined in said rotor adjacent to trailing sides of said slots and of said outer tip portions of said vanes with reference to the direction of rotation of said rotor relative to said stator housing such that said gas inlet port means now transfers pressurized gas to successive ones of said gas receiving pockets in said rotor to enable the expansion of the pressurized gas in said successive pockets to cause rotation of said rotor and said output shaft therewith.

7. A non-contact rotary vane gas expanding apparatus for converting controlled expansion of gas to rotary motive power, said apparatus comprising:

(a) a stator housing including a primary bore having a primary surface curved concentrically around a stator axis and a secondary bore having a secondary surface curved concentrically about a rotor axis extending parallel to and spaced a preselected distance from said stator axis, said secondary surface intersecting said primary surface to form angularly spaced edge junctions on said stator housing being respectively leading and trailing with respect to one another and with reference to a predetermined direction of rotation within said stator housing;

(b) a rotor supported in said primary bore of said stator housing and having an outer surface curved concentrically around said rotor axis, said rotor axis being offset from said stator axis toward said secondary surface such that said outer surface of said rotor undergoes rotation about said rotor axis in eccentric relation to said primary surface and in concentric relation to said secondary surface, said rotor having a rotor radius and said secondary bore having a radius equal to said rotor radius plus a preselected gap clearance selected to be relatively small so as to provide a gas sealing function preventing respective gas flow adjacent to said rotor outer surface and stator secondary surface between said angularly spaced leading and trailing edge junctions thereof;

(c) means defining at least one slot defined in said rotor extending radially relative to said rotor axis and terminating at said outer surface of said rotor;

(d) means defining a gas receiving pocket in said rotor adjacent to each said radially extending slot at a trailing side thereof relative to the direction of rotation of said rotor;

(e) at least one vane, said vane being disposed in said slot of said rotor and being movable radially within said slot relative to said rotor and said rotor axis thereof, said vane having an outer tip surface spaced from said primary and secondary surfaces of said stator housing by a preselected clearance so as to provide a gas seal therewith preventing gas flow past said outer tip surface of said vane between said vane and said primary and secondary surfaces of said stator housing;

(f) means defining a gas inlet port in said stator housing open into said secondary bore downstream from said leading edge junction of said stator housing; and (g) means defining a gas outlet port in said stator housing open only into said primary bore and disposed at a preselected angular distance upstream from said leading edge junction on said stator housing such that said gas expanding apparatus can function as a motor and said rotor can function as a part of a rotary drive shaft when an initial volume of gas under pressure is transferred through said secondary bore to said gas receiving pocket disposed adjacent to said trailing side of said vane via said gas inlet port when said vane is disposed proximate to said secondary bore, said initial volume of pressurized gas expanding thereafter and causing rotation of said rotor by the effect of said pressurized gas being applied on said trailing side of said rotor vane adjacent to said gas receiving pocket.

8. The apparatus of claim 7 wherein said gas inlet port includes a plurality of passages defined through said stator housing in closely spaced relation to one another.

9. The apparatus of claim 8 further comprising:

an inlet control member mounted in a channel formed in said stator housing outwardly from said secondary bore, said inlet control member being adjustably movable along said spaced passages of said gas inlet port in order to vary the number of said passages covered by said inlet control member and thereby vary the amount of pressurized gas that enters said gas receiving pocket.

10. The apparatus of claim 7 further comprising:

means disposed in said stator housing and coupled to said at least one vane for controlling said radial reciprocable movement thereof in said rotor slot so that said outer tip portion of said vane is continuously positioned adjacent to said primary and secondary surfaces of said stator housing and spaced therefrom by a preselected clearance so as to be maintained in said non-contacting substantially sealed relationship with said stator housing.

11. The apparatus of claim 10 wherein said vane movement is controlling means includes a pair of annular bearings disposed in opposite ends of said stator housing and an axle extending between said bearings and through said vane.

12. The apparatus of claim 11 wherein each of said annular bearings includes an outer race, an inner race, a plurality of rollers disposed between said outer and inner races, and a pair of opposing gliders disposed between and movably mounted by said rollers and said inner race, said axle being rotatably supported at opposite ends by said pair of opposing gliders.

13. The apparatus of claim 7 further comprising:

a plurality of said vanes disposed in a plurality of said radial slots defined in the rotor and being spaced circumferentially from one another and radially reciprocable relative to said rotor and said outer tip portions of the reciprocable vanes being maintained in non-contacting substantially sealed relationships with said stator housing.

14. The apparatus of claim 13 further comprising:

a plurality of said gas receiving pockets defined in said rotor adjacent to trailing sides of said slots and of said outer tip portions of said vanes with reference to the direction of rotation of said rotor relative to said stator housing such that said gas inlet port means now transfers pressurized gas to successive ones of said gas receiving pockets in said rotor to enable the expansion of the pressurized gas in said successive pockets to cause rotation of said rotor and said output shaft therewith.

\* \* \* \* \*